June 9, 1953 C. JAY ET AL 2,641,437
CHECK VALVE WITH SUPPLEMENTAL CAM ACTUATOR
Filed May 3, 1948 2 Sheets-Sheet 1
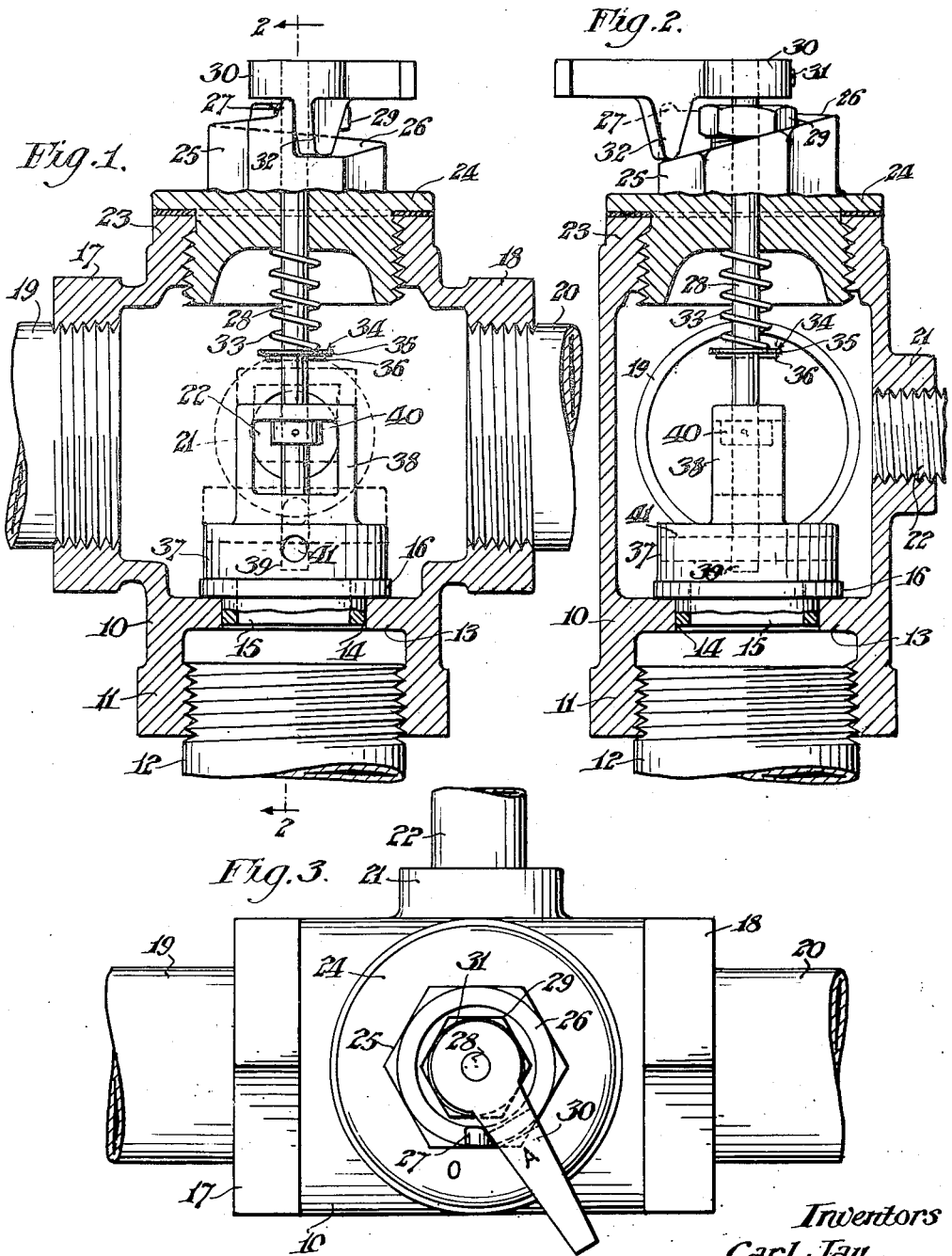
Inventors
Carl Jay,
Bernard Jay
and Jules Jay
By W. W. Williamson
Attorney.

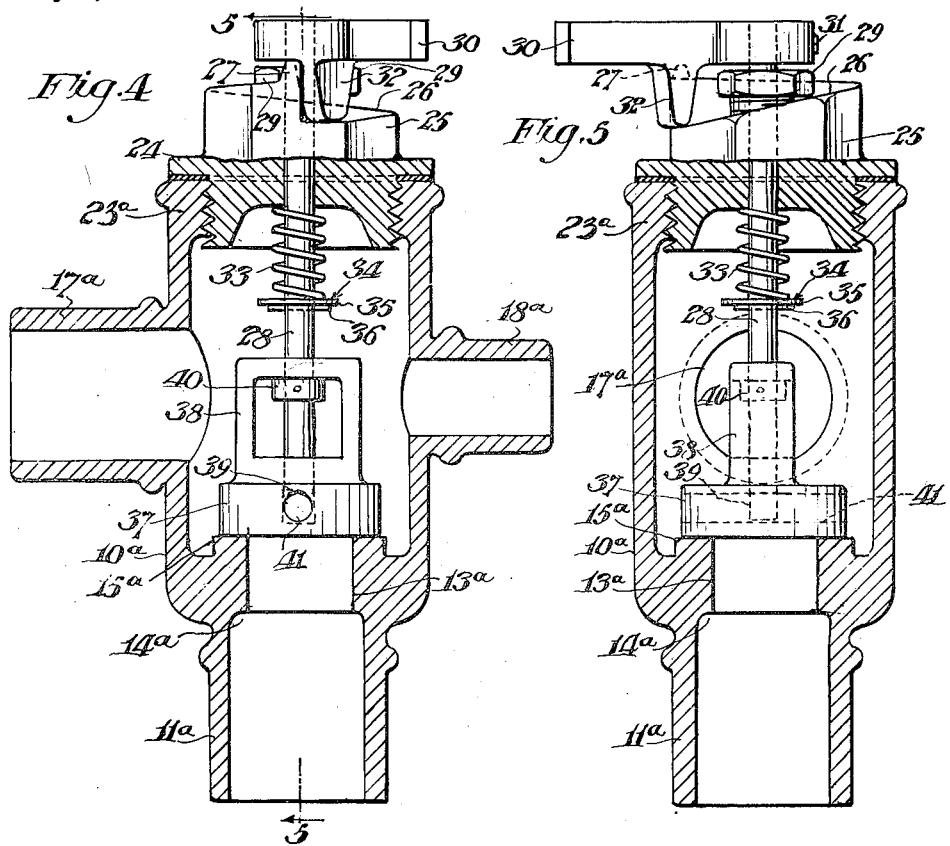
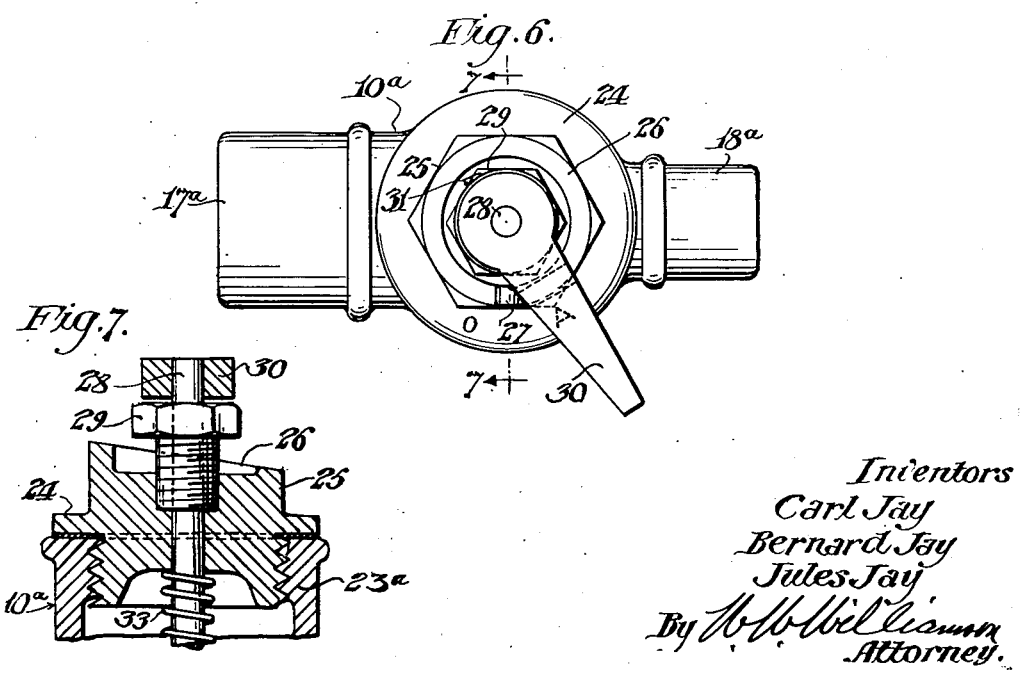

Patented June 9, 1953

2,641,437

UNITED STATES PATENT OFFICE 2,641,437

CHECK VALVE WITH SUPPLEMENTAL CAM ACTUATOR

Carl Jay, Bernard Jay, and Jules Jay, Philadelphia, Pa.

Application May 3, 1948, Serial No. 24,884

2 Claims. (Cl. 251—131)

Our invention relates to new and useful two-directional flow control valves and has for one of its objects to provide a device of this character which is especially adapted for installation in the main line of a hot water heating system to control the flow of fluid from a source of supply, such as a boiler.

Another object of this invention is to provide a valve structure having the characteristics of a check and manually operated valve whereby it can function automatically or be retained in a temporary open condition should some other part of the system, in which the device is installed, get out of order.

Another object of the invention is to provide a relatively simple and inexpensive valve structure which can be so installed in a heating system that fluid may flow in two opposite directions directly to two branches of a heating system thereby eliminating many heretofore necessary fittings and reducing skin or water friction which will relieve unnecessary pressure on working parts or apparatus in the system.

Another object of the present invention is to construct a valve including a body having an inlet and at least two oppositely disposed outlets, said inlet being controlled by a valve plug slidably mounted on a stem, urged inwardly by a spring so positioned that the valve plug may function as an oscillating check, said stem being retractable by rotation of a handle coacting with an inclined cam surface.

A further object of the invention is to provide a valve plug of unique construction including a wash-out opening whereby any foreign matter entering the stem receiving guide socket may be expelled by fluid passing through the valve.

A still further object of this invention is to provide a combination manually operated and automatic check valve.

With the above and other objects in view, which will become apparent from the following description, this invention consists of the details of construction and combination of elements hereinafter set forth and then designated by the claims.

In order that those skilled in the art to which this invention appertains may understand how to make and use the same I will describe the construction in detail referring by numerals to the accompanying drawing forming a part hereof, in which:

Fig. 1 is a view of one form of the two-directional flow control valve, with some parts in section and other parts in elevation.

Fig. 2 is a similar view on the line 2—2 of Fig. 1.

Fig. 3 is an upper end of plan view of the same.

Fig. 4 is a view, partly in section and partly in elevation of another form of the valve.

Fig. 5 is a similar view on the line 5—5 of Fig. 4.

Fig. 6 is a top end or plan view thereof.

Fig. 7 is a fragmentary section on the line 7—7 of Fig. 6 illustrating details of construction of the cap, cam surface and packing gland of either type of valve.

In carrying out our invention as herein embodied, reference being first had to Figs. 1, 2, and 3, 10 represents the body of the valve having an inlet 11 at the lower end so that hot water can be fed vertically into the valve body from a feed pipe 12 leading from a boiler. Within the inlet 11 is an integral circular partition, internal flange or diaphragm 13, in the opening 14 of which is securely mounted a fixed tubular valve seat 15 having a thick flange 16 that rests on the diaphragm 13 and positions the working or valve seat face above the adjacent face of said diaphragm. The valve seat face being above the diaphragm provides a well into which any foreign matter may settle and prevents the accumulation of such matter on the valve seat face and therefore insures a perfect seating of the valve to be later described. The valve seat can be provided in another way as will be disclosed in the modification.

The valve body particularly has two directly oppositely disposed outlets 17 and 18 each to be connected to a separate main 19 and 20, respectively of branches of a heating system leading to locations of utilization. In addition to the two main outlets 17 and 18, the valve body may have a third outlet 21 for connection with a pipe 22 leading to a compression or expansion tank which is a part of the heating system, and said third outlet is, preferably, smaller than the two main outlets.

At the top of the valve body directly in line with the inlet is an internally threaded neck 23 to receive a cap to be presently described. The inlet and the several outlets may be provided with threads as shown.

Now referring to Figs. 4, 5 and 6, 10a denotes a valve body of a modified form of the invention, said body having an inlet 11a at the bottom thereof so that hot water can be fed into the valve body from a boiler as previously stated. Within the inlet 11a is formed an integral circular partition, internal flange or diaphragm 13a with which is formed the opening 14a through the diaphragm. The working or valve seat face being above the surrounding adjacent surface of the diaphragm there is provided a well to receive any foreign matter that might otherwise foul the valve seat face.

The valve body has two directly oppositely disposed outlets 17a and 18a to be connected to different lines of supply, as to two separate mains or branches of a heating system or to one main and a line leading to a compression or expansion tank of said heating system. While the two outlets may be of the same size they may be of different sizes and the outlet 18a, preferably is the smaller.

Like the first described form of the device, the present one has an internally threaded neck 23a projecting from the top of the valve body directly in line with the inlet. The inlet 11a and the outlets 17a and 18a are shown as of smooth formation to which may be sweated the several connecting pipes and it is to be understood that said inlet and outlets, if desired, can be threaded and likewise the inlet and outlets of the form of the device shown in Figs. 1, 2 and 3 may be plain for sweating pipes thereto.

In each form of the device illustrated, an identically constructed cap 24 is screwed into the neck 23, 23a having a polygonal boss 25 thereon so a wrench can be used for tightening said cap. The top face of the boss has a gradually inclined cam surface 26 fashioned therefrom and at the high point is a stop 27.

A valve stem 28 projects through a hole in the cap and the joint between said valve stem and the walls of the cap are suitably packed to prevent leakage and for this purpose a packing gland 29 is shown as screwed into a counterbore and surrounding the outer end of the valve stem.

On the outer extremity of said valve stem 28 is secured a handle 30 of suitable size and shape, by any fastening device, such as a set screw 31. This handle 30 has a depending projection 32 to ride on the cam surface 26 for projecting or lifting the valve stem as the handle is rotated in the direction to cause the projection to ascend the cam surface and permit the retraction of said valve stem as the handle is rotated in the opposite direction.

The valve stem 28 is urged inwardly for retraction by a spring 33 having one end in engagement with the inside of the cap, as the stationary element, and the other end engaging a shoulder 34 on the valve stem, as the movable element. Said shoulder may be in the form of a washer 35 on the valve stem and resting against a pin 36 projected through the stem, or some other equivalent means.

On the inner or lower end of the valve stem 28 is loosely mounted a valve plug 37 for vertical reciprocation on said stem and relative to the valve seat 15, 15a. The valve plug is provided with a yoke 38 and the valve stem projects through the crosspiece of said yoke and into a guide socket 39 in the top of the valve plug so that the latter will be accurately guided in its to and fro movements. The depth of the guide socket is slightly greater than the distance between the outer face of the crosspiece of the yoke 38 and the opposed face of the shoulder structure 34 whereby when the valve is seated the inner end of the stem remains within the guide socket and sufficient space is provided between the inner terminal of said stem and the bottom of the guide socket to allow for the opening movement of said valve. On the valve stem within the yoke is mounted a collar 40 which coacts with said crosspiece of the yoke, under certain conditions, to lift the valve plug from its seat and hold said valve plug suspended in an inoperative position, as indicated by dotted lines in Fig. 1.

A diametrical flushing hole 41 is formed completely through the valve plug, from side to side, in communication with the guide socket 39 to permit any foreign matter that might enter said guide socket to be flushed or washed out, thereby eliminating any chance of the valve plug not being able to rise on the stem.

Generally, a circulator is connected with the return side or pipe of the heating system but a certain amount of pressure can be built up in the boiler by the application of sufficient heat, by agitation of the hot water or by the use of a suitable pump. In any case, when circulation of hot water is required in the heating system for heating purposes, the valve plug will be lifted from its seat by the water flow but will close immediately should any retrograde movement of the water take place or should the progressive flow cease. This will prevent flow of the hot water from the boiler when in a static condition or the circulator or pump is not operating thus conserving the heat in the boiler water until circulation thereof through the heating system is again required. Such an arrangement is especially valuable if thermostatic controls are used in connection with the heating system. Should the circulator or pump get out of order and become inoperative the hot water may be permitted to flow to and through the heating system by the natural tendency of hot water to rise. In such a case the valve handle is rotated in the direction to cause it to ride up the inclined cam surface. This will move the valve stem outward and lift the valve from its seat so there will be an unobstructed passageway from the feed pipe to the supply lines.

Particular attention is called to the relation of the neck with the cap therein, the valve plug and its connections, and the valve seat. If the valve plug or the seat require servicing or replacement it is only necessary to remove the cap and access may be had to all of the working parts.

From the foregoing it will be apparent that we have provided an exceedingly simple and effective valve of the type mentioned for easy and quick installation in a heating system that will, under ordinary and preferred conditions, control the flow of hot water from a boiler while permitting circulation under extraordinary conditions, as when some operating part fails to work properly. Since the flow is direct from the valve in two directions for supplying two parts or branches of a heating system a great many installation difficulties are eliminated and less piping and fittings are needed. This produces a much neater and more compact arrangement of pipes and eliminates many bends or turns thus reducing skin and water friction to a minimum resulting in faster circulation and a balanced radiation load. Not only are more efficient results obtained but savings in material and labor accrue from the use of this valve.

In actual practice, when the valve is to be set for automatic operation the handle 30 is turned to the position indicated by the index "A" on top of the cap at which time the lug 32 is on the lowest part of the cam surface, whereas when the valve is to be retained in the open position said handle is rotated almost a complete turn until it reaches the position indicated by the index "O" at which time the lug 32 is on the highest elevation of the cam surface. This will raise the valve plug from the seat and hold it out of contact therewith so the hot water can flow unobstructed.

Of course we do not wish to be limited to the exact details of construction herein shown and described as these may be varied within the scope of the appended claims without departing from the spirit of our invention.

Having described our invention what we claim as new and useful is:

1. A valve comprising a body having an inlet and three correlated outlets, at least two of said outlets being directly opposite each other and at right angles to the inlet, a valve seat about the inlet, a neck on said body directly opposite the inlet, a cap removably mounted in said neck, a valve stem projected through said cap and slidably and rotatably assembled in the cap, a spring to automatically constantly urge said stem inwardly, means at the outer end of said stem to rotate and cause it to slide outwardly and permit it to be moved inwardly, a collar on said stem adjacent the inner end thereof, and a valve plug slidably mounted on said stem outwardly of said collar whereby said valve plug freely reciprocates on said stem when the latter is in such position that said valve plug can engage the valve seat, said collar engaging the valve plug to bodily lift said valve plug when the stem is moved outwardly.

2. The valve structure according to claim 1 in which the valve plug has a guide socket to slidingly receive the inner end portion of the stem and further provided with a through and through diametrically positioned flushing hole communicating with said guide socket.

CARL JAY.
BERNARD JAY.
JULES JAY.

References Cited in the file of this patent

UNITED STATES PATENTS

| Number | Name | Date |
|---|---|---|
| 589,142 | Roseberry | Aug. 31, 1897 |
| 868,371 | Tabor | Oct. 15, 1907 |
| 1,354,440 | Mowry | Sept. 28, 1920 |
| 1,584,587 | Yardley | May 11, 1926 |
| 1,740,420 | Friedman | Dec. 17, 1929 |
| 1,834,276 | Hallett | Dec. 1, 1931 |
| 1,872,632 | Brindley | Aug. 16, 1932 |
| 2,052,827 | Hexamer | Sept. 1, 1936 |
| 2,129,986 | Berghoefer | Sept. 13, 1938 |
| 2,138,125 | Schultz | Nov. 29, 1938 |
| 2,420,588 | Dunnihoo | May 13, 1947 |
| 2,441,253 | Sarver | May 11, 1948 |

FOREIGN PATENTS

| Number | Country | Date |
|---|---|---|
| 7,716 | Great Britain | of 1884 |
| 34,509 | Denmark | of 1925 |